(12) United States Patent
Guillermond et al.

(10) Patent No.: US 8,991,763 B2
(45) Date of Patent: Mar. 31, 2015

(54) DE-ICING AND/OR ANTI-ICING SYSTEM FOR THE LEADING EDGE OF AN AIRCRAFT WING

(75) Inventors: Alain Guillermond, Maneglise (FR); Thierry Le Docte, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 382 days.

(21) Appl. No.: 12/988,699

(22) PCT Filed: Jan. 12, 2009

(86) PCT No.: PCT/FR2009/000033
§ 371 (c)(1),
(2), (4) Date: Oct. 20, 2010

(87) PCT Pub. No.: WO2009/130400
PCT Pub. Date: Oct. 29, 2009

(65) Prior Publication Data
US 2011/0036950 A1    Feb. 17, 2011

(30) Foreign Application Priority Data
Apr. 21, 2008   (FR) ...................................... 08 02200

(51) Int. Cl.
*B64D 15/12*    (2006.01)
*B64D 33/02*    (2006.01)

(52) U.S. Cl.
CPC ........ *B64D 15/12* (2013.01); *B64D 2033/0233* (2013.01)
USPC ............... 244/134 R; 244/134 D; 244/134 B; 219/545

(58) Field of Classification Search
USPC ................ 244/134 D, 134 R, 134 B; 219/545
See application file for complete search history.

(56) References Cited

U.S. PATENT DOCUMENTS

| | | | |
|---|---|---|---|
| 2,317,019 A | | 4/1943 | Altemus |
| 2,681,409 A | | 6/1954 | Dobbins |
| 5,129,598 A | * | 7/1992 | Adams et al. ............. 244/134 D |
| 5,206,806 A | * | 4/1993 | Gerardi et al. ................. 340/582 |
| 5,272,400 A | * | 12/1993 | Goldberg et al. ............... 310/10 |
| 5,429,327 A | * | 7/1995 | Adams ....................... 244/134 D |
| 5,467,944 A | * | 11/1995 | Luukkala ................... 244/134 F |
| 5,484,121 A | * | 1/1996 | Padawer et al. ............ 244/134 F |

(Continued)

FOREIGN PATENT DOCUMENTS

| | | |
|---|---|---|
| DE | 19745621 | 11/1998 |
| DE | 20 2006 007228 | 10/2006 |

(Continued)

OTHER PUBLICATIONS

National Plastic Heater, Sensors & Control Co. 'Ceramic Infrared Emitters Technical Manual', pp. 4, 8, 11.*

(Continued)

*Primary Examiner* — Tien Dinh
*Assistant Examiner* — Assres H Woldemaryam
(74) *Attorney, Agent, or Firm* — Brinks Gilson & Lione

(57) ABSTRACT

The invention relates to a de-icing and/or anti-icing system for the leading edge of an aircraft wing or for the lip (1) of the air intake of an aircraft engine, characterised in that it includes a plurality of infrared emitting members (13) arranged inside said leading edge or said lip (1), power supply means (17) for said emitters (13), and means (27) for controlling said power supply means (17).

10 Claims, 3 Drawing Sheets

(56) References Cited

U.S. PATENT DOCUMENTS

| | | | |
|---|---|---|---|
| 5,770,794 A * | 6/1998 | Davey | 73/37 |
| 5,947,418 A * | 9/1999 | Bessiere et al. | 244/134 D |
| 5,971,323 A * | 10/1999 | Rauch et al. | 244/134 D |
| 6,079,670 A * | 6/2000 | Porte | 244/134 B |
| 6,196,500 B1 * | 3/2001 | Al-Khalil et al. | 244/134 R |
| 6,206,325 B1 * | 3/2001 | Nunnally | 244/134 E |
| 6,283,411 B1 * | 9/2001 | Giamati et al. | 244/134 A |
| 6,338,455 B1 * | 1/2002 | Rauch et al. | 244/134 D |
| 6,378,225 B1 * | 4/2002 | Slingo | 34/97 |
| 6,427,946 B1 * | 8/2002 | Petrenko | 244/134 R |
| RE38,024 E * | 3/2003 | Adams et al. | 244/134 D |
| 7,246,773 B2 * | 7/2007 | Stoner et al. | 244/134 D |
| 7,469,862 B2 * | 12/2008 | Layland et al. | 244/134 D |
| 7,546,980 B2 * | 6/2009 | Giamati | 244/134 D |
| 7,556,221 B2 * | 7/2009 | Hindel et al. | 244/134 D |
| 7,631,838 B2 * | 12/2009 | Layland et al. | 244/134 D |
| 7,780,117 B2 * | 8/2010 | Botura et al. | 244/134 D |
| 7,784,739 B2 * | 8/2010 | Nichols | 244/134 F |
| 7,789,620 B2 * | 9/2010 | Vontell et al. | 415/178 |
| 7,909,291 B2 * | 3/2011 | Nichols | 244/134 F |
| 7,923,668 B2 * | 4/2011 | Layland et al. | 219/535 |
| 8,146,866 B2 * | 4/2012 | Tenebre et al. | 244/134 R |
| 2009/0224104 A1 * | 9/2009 | Tenebre et al. | 244/134 R |

FOREIGN PATENT DOCUMENTS

| | | |
|---|---|---|
| FR | 920828 | 4/1947 |
| WO | 0108973 | 2/2001 |

OTHER PUBLICATIONS

Ogden, "Process Infrared heating", p. 2, col. 1.*
International Search Report; PCT/FR2009/000033; Sep. 7, 2009.

* cited by examiner

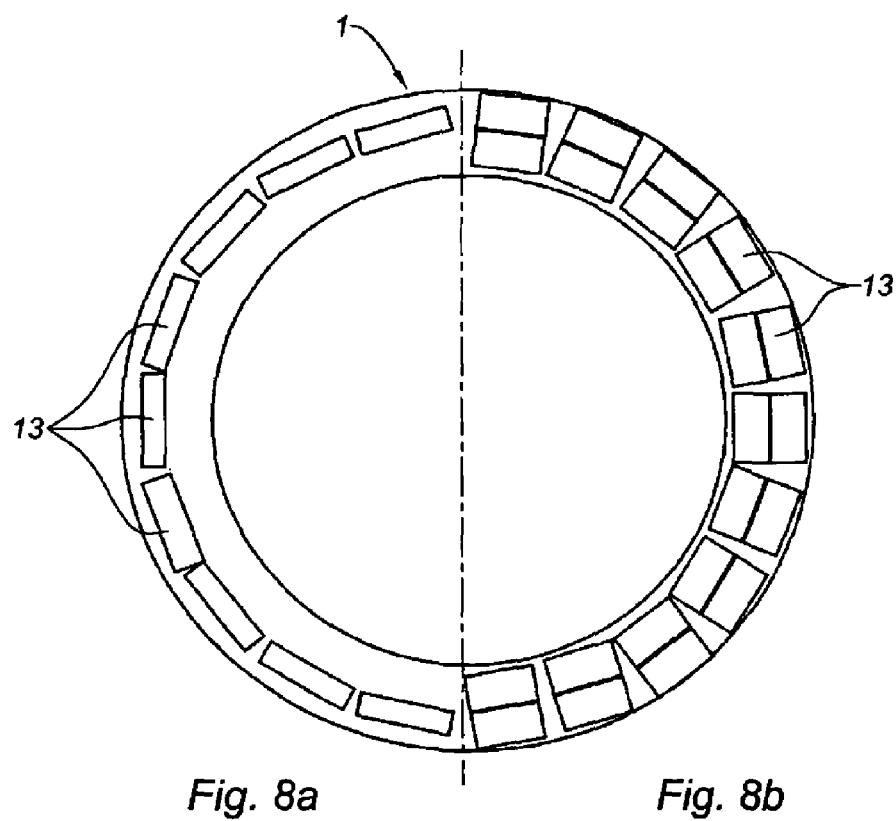
Fig. 8a   Fig. 8b
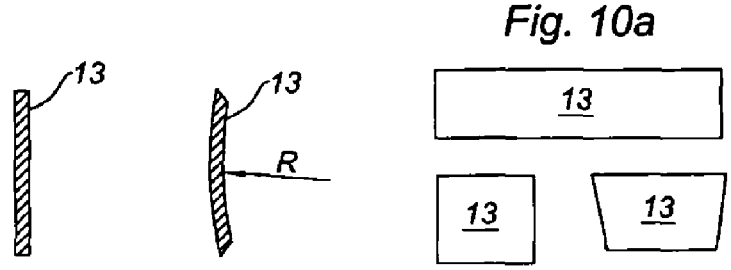
Fig. 9a   Fig. 9b   Fig. 10b   Fig. 10c
Fig. 10a

DE-ICING AND/OR ANTI-ICING SYSTEM FOR THE LEADING EDGE OF AN AIRCRAFT WING

TECHNICAL FIELD

The present invention relates to a de-icing and/or anti-icing system for the leading edge of an aircraft wing or for an air intake lip of an aircraft engine, and a method for controlling such a system.

BACKGROUND

The formation of ice on the leading edges of an aircraft wing or on the air intake lips of aircraft engines poses many problems, including added weight, imbalance between the port and starboard portions, and, in the specific case of engine air intakes, the formation of blocks of ice capable of penetrating the engine and causing considerable damage.

To this end, a number of de-icing or anti-icing systems have been developed in the aeronautics field, recalling here that de-icing consists of evacuating ice that has already formed, and anti-icing consists of preventing the formation of ice.

Anti-icing is necessary in particular in the case of engines comprising portions made from composite materials, such as fan blades: in such cases, it is necessary to eliminate any risk of ice reaching the engine, the composite materials not being able to resist such a shock.

The de-icing systems of the prior art can be divided into two categories of systems: pneumatic systems and electric systems.

In pneumatic systems, hot air is taken from the engine, and that hot air is made to circulate inside the leading edge or air intake lip to be de-iced, using a circuit of ducts provided with appropriately placed orifices.

Although these pneumatic systems are relatively effective, they have a number of drawbacks: they are bulky, heavy, and degrade the performance of the aircraft's engines.

In electric systems, a resistive pad is powered using a current created by power supply members of the aircraft. These resistors are generally arranged in the skin of the leading edge or air intake lip.

Although these electric systems are relatively effective, they have a number of drawbacks: their production is delicate, they are sensitive.

BRIEF SUMMARY

The present invention thus aims in particular to provide a system not having the aforementioned drawbacks, and that is adapted both for de-icing and anti-icing.

This aim of the invention is achieved with a de-icing and/or anti-icing system for a leading edge of an aircraft wing or for an air intake lip of an aircraft engine, remarkable in that it comprises a plurality of infrared emitting members arranged inside said leading edge or said lip, the power supply means for said emitters, and means for controlling said power supply means.

The use of infrared emitting members is particularly advantageous: such emitters, commercially available, make it possible to eliminate any withdrawal of hot air on the engines; they have an excellent radiated power/weight ratio: typically in the vicinity of 500 W for 100 g; they take up little space and can easily be changed; they have a long lifetime, typically greater than 10,000 h; they have a strong emissivity, typically in the vicinity of 97% at 800° C. over a spectrum between 1.5 µm and 10 µm (in comparison, a quartz tube has an emissivity in the vicinity of 70%); they have a low thermal inertia, typically allowing, for a 1000 W emitter, a temperature rise of 700° C. in 100 seconds; they make it possible to eliminate the lightning sensitivity problems, since they can be mounted inside the cavity defined by the leading edge or by the air intake lip; they are particularly adapted to anti-icing, since they make it possible to achieve a high surface energy, greater than 70 kW per square meter; they consume little electric current, due to their excellent efficiency, greater than 95%: such an efficiency is due to the fact that the infrared emitting member used is close to a full radiator and the infrared radiation heats the materials, which absorb it, but not the air situated between the emitting member and these materials.

According to other optional features of this system according to the invention:

said infrared emitting members comprise heating resistors included in a ceramic having a highly emissive special outer coating such emitters meet the needs perfectly, and are commonly available on the market, in particular under the Infraline® mark;

said infrared emitting members are mounted away from the inner wall of said leading edge or said lip, on support means fixed inside said leading edge or said lip: this configuration is particularly suitable when the leading edge or the lip is made from composite materials, which do not offer sufficient resistance to the temperatures in the immediate vicinity of the infrared emitting members;

said support means are connected to the front partition of said air intake, or to structural stiffening pieces situated in the front portion of the air intake: this front partition (which separates the cavity defined by the air intake lip from the rest of said air intake), or these structural stiffening pieces (in the case where there is no front partition), constitute stiff enough supports to support the infrared emitting members;

said support means extends between said front partition (or said structural stiffening pieces) and the inner wall of said lip: this solution, in which the support means is fastened both on the front partition (or on said structural stiffening pieces) and on the inner wall of the lip, allows excellent stability of the infrared emitters, in particular with regard to vibrations;

said air intake lip comprises a metal inner wall, and said infrared emitters are fixed on said wall or in the immediate vicinity thereof: this metal inner wall, present in particular when the lip comprises a skin incorporating a metal honeycomb structure, is capable of resisting the high temperatures reigning in the immediate vicinity of the infrared emitters;

said infrared emitters are distributed on an inner circumference of said lip so as to optimize their action: this distribution allows a homogenous de-icing/anti-icing of the entire lip;

said power supply means can be connected to a power source on board or located on the ground: the connection with an onboard power source makes it possible to implement the de-icing/anti-icing functions during flight, and the connection with a power source on the ground makes it possible to implement these functions when the aircraft is on the tarmac, including when it is competed stopped (engines cut);

said control means are capable of adjusting the voltage and/or intensity and/or duration of said power supply means, so as to regulate the heating energy radiated toward the inner wall of said leading edge or said lip;

said system comprises first temperature sensors arranged near the inner wall of said leading edge or said lip and electrically connected to said control means, and said control means are capable of regulating the voltage and/or intensity and/or duration of the power supply of said infrared emitting members as a function of the signals received from said sensors: these first temperature sensors make it possible to control the temperature of the surface contacted by the emitting members so as not to exceed a predetermined maximum temperature;

said system comprises two temperature sensors arranged in the immediate vicinity of said infrared emitters and electrically connected to said control means, and said control means are capable of regulating the voltage and/or intensity and/or duration of the power supply of said infrared emitters as a function of the signals received from said second sensors: these second sensors make it possible to control the surface temperature of the infrared emitters, and thus to master the emitting frequency band of the infrared radiation;

said emitters are organized to be controlled either individually or in groups depending on the de-icing needs and the size of said air intake;

said emitters are distributed such that a defect detected on one of them by the control means causes an increase in the power delivered by the neighboring emitters, making it possible to offset said defect;

an integrated self-test makes it possible to detect any defect of one of the components of the system during maintenance on the ground.

The invention also concerns a method for controlling a system according to the preceding, in which one interrupts the operation of said power supply means for short periods during which one must make other equipment of said aircraft function, such as a thrust reverser with electric actuators: given the thermal inertia of the heated parts, this method makes it possible to have maximal power for said other equipment of the aircraft, while keeping the temperature substantially constant in the areas to be de-iced.

The present invention also concerns a method for controlling a system according to the preceding, in which one controls said power supply means such that said infrared emitters emit in a given radiation band, set in advance and depending on the material making up the leading edge or the air intake lip, so as to optimize the heat transfer toward the surface to be de-iced.

BRIEF DESCRIPTION OF THE DRAWINGS

Other features and advantages of the present invention will appear in light of the following description, and upon examining the appended figures, in which:

FIGS. 8a and 8b are axial half-views corresponding to the embodiments of FIGS. 1 and 4, respectively, diagrammatically indicating one possible distribution of the infrared emitting members depending on the circumference of the air intake lip, FIGS. 9a and 9b are cross-sectional views of two possible embodiments of infrared emitters according to the invention, and FIGS. 10a to 10c are flat views of three possible embodiments of infrared emitters according to the invention.

DETAILED DESCRIPTION

In the following, the system according to the invention will be described when it is integrated with an air intake lip of an aircraft engine.

It must, however, be remembered that the invention can also apply to a leading edge of an aircraft wing.

Figure 1:
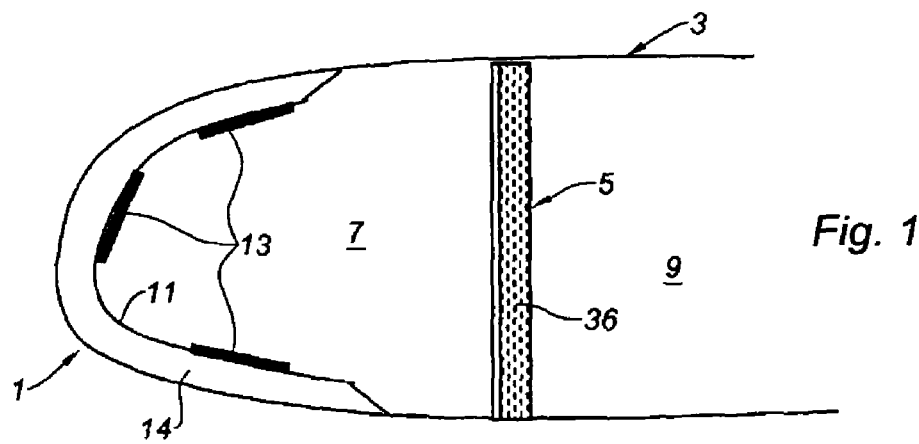
FIG. 1 shows, in longitudinal diagrammatic cross-section, an air intake lip of an aircraft engine, equipped with a system according to the invention according to a first embodiment.

We will now refer to FIG. 1, which shows an air intake 3 lip 1 of the aircraft engine.

As known in itself, the air intake of an aircraft engine, which is part of the nacelle surrounding said engine, is a sort of substantially annular shroud making it possible to capture outside air and orient it toward the fan, then toward the compressor of the aircraft engine.

The lip 1 of this air intake 3 is the leading edge thereof in a way, i.e. the edge that separates the stream of air entering the engine from that flowing toward the outside of the nacelle.

As known in itself, the air intake 3 generally comprises a partition 5 called "front partition" separating the cavity 7 defined by the lip 1 from the rest of the inner area 9 of the air intake.

This front partition 5 has a structural function, on one hand, making it possible to ensure good resistance of the air intake structure, and a thermal insulation function, on the other hand, of the cavity 7 in relation to the area 9, so as to confine the heat in the area to be de-iced.

In this cavity 7 there are in fact de-icing means, creating the heat that needs to be kept in contact with the inner wall 11 of the lip 1, so as to obtain optimal de-icing effectiveness.

More particularly, in the context of the present invention, this de-icing means comprises a plurality of infrared emitting members 13, fixed on the inner wall 11 of the lip 1. It should be noted that this first embodiment, in which these infrared emitters 13 are fixed directly on said inner wall 11, is quite suitable when said inner wall 11 has a high heat resistance, in particular when it is metal.

This is the case in particular when the lip 1 is formed by a metal honeycomb structure 14, in which the inner wall 11 is formed by a metal skin.

In longitudinal cross-section, the infrared emitters 13 can typically be arranged in three separate places, as shown in FIG. 1.

In axial view, these emitters are preferably distributed substantially regularly over the inner circumference of the lip 1, as shown in FIG. 8a.

Figure 2:
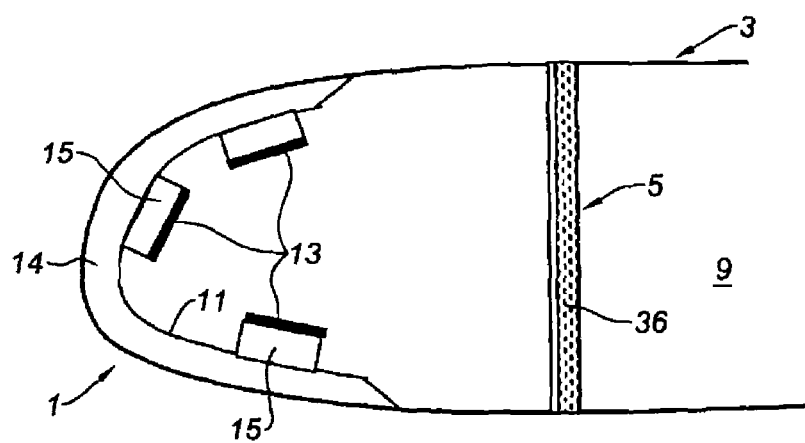
FIG. 2 shows, according to a view similar to FIG. 1, an alternative of the first embodiment.

In the alternative illustrated in FIG. 2, the infrared emitters 13 are connected to the inner wall 11 of the lip 1 via supports 15.

The infrared emitters 13 can be ceramic emitters (resistances embedded in a ceramic support) powered by an electric current or voltage source.

Such emitters are commercially available, in particular under the INFRALINE® mark.

The energy of this type of infrared emitter is in the vicinity of 74 kW/m2, which makes it possible to have a power of about 1 kW under 235 V for 200 mm×64 mm emitters.

Such emitters can assume a substantially rectangular, square or trapezoidal shape, as shown in FIGS. 9a, 9b, 10a, 10b and 10c.

Advantageously, and as shown in FIG. 9b, these emitters can have a radius of curvature R, so as to best diffuse the infrared radiation toward said lip.

Figure 3:
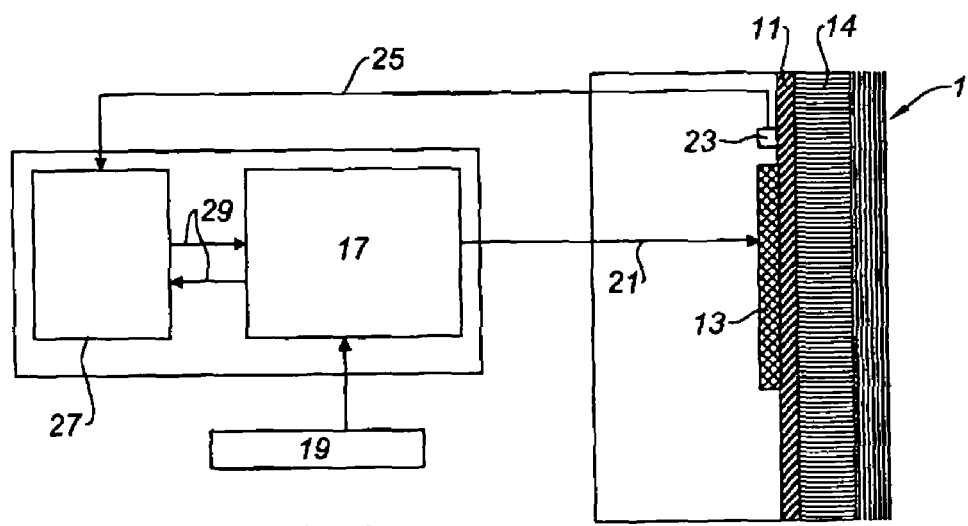
FIG. 3 shows, diagrammatically, the control circuit of this first embodiment of the system according to the invention.

FIG. 3 shows the electric circuit making it possible to control the infrared emitters 13.

This electric circuit comprises a power source 17 connected to an electrical source 19 onboard the aircraft, or situated on the ground and disconnectably connected to the power supply 17.

A network of cables 21 makes it possible to connect the power supply 17 to the infrared emitters 13.

This network of cables 21 can preferably be disconnected from the infrared emitters 13 simply, so as to allow easy replacement of the latter parts individually or in groups.

The diagram illustrated in FIG. 3 corresponds more particularly to the alternative of FIG. 1, and the infrared emitters 13 are thus fixed on the inner metal wall of the honeycomb structure 14 of the lip 1.

On the metal wall 11 are temperature sensors 23. These temperature sensors 23 are connected by suitable cabling 25 to an electronic control unit 27 acting, via suitable cabling 29, on the power supply 17.

As will be understood, the sensors 23 and the cabling means 25 constitute a feedback loop, making it possible, owing to control means 27, to regulate the voltage and/or intensity and/or duration (with periodic outage periods, for example) of the power supply of the infrared emitters 13, therefore the temperature of the inner wall 11, and therefore the de-icing and/or anti-icing temperature of the lip 1.

Figure 4:
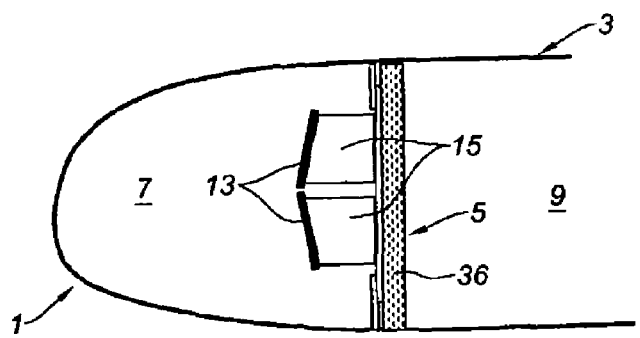
FIGS. 4 to 6 show, according to views similar to FIGS. 1 and 3, three alternatives of a second embodiment according to the invention.

In the embodiment illustrated in FIG. 4, the lip 1 is made from a composite material, and does not have a metal inner wall 11, as was the case in the preceding embodiment.

In this case, it is not possible to place the infrared emitters 13 in the immediate vicinity of the inner wall of the lip 1, failing which there would be a real risk of damaging said lip under the effect of the very high temperature in the immediate vicinity of the infrared emitters.

For that reason, it is necessary to distance the infrared emitters from the inner wall of the lip 1.

In the alternative illustrated in FIG. 4, these emitters 13 are fixed on a front partition 5 via supports 15, and are arranged in pairs.

The corresponding axial view is the view of FIG. 8b, in which one can see that these pairs of infrared emitters are regularly distributed over an inner circumference of the air intake lip, similarly to the preceding embodiment.

Figure 5:
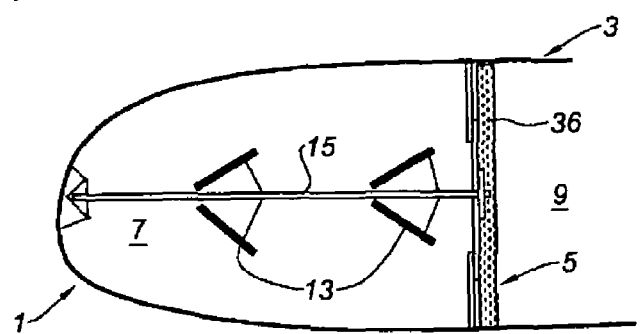

In the embodiment illustrated in FIG. 5, the infrared emitters 13 are fixed on a support 15 that extends between the inner wall of the lip 1 and the front partition 5.

Such a support can comprise a tubular structure on which pairs of infrared emitters are fixed two by two oriented toward the lip 1, as can be seen in FIG. 5.

In this case, a plurality of supports 15 and their infrared emitters is distributed evenly on an inner circumference of the lip 1.

Figure 6:
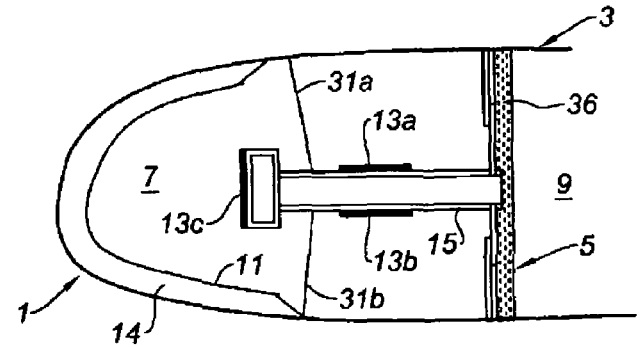

FIG. 6 shows another alternative, in which the infrared emitters 13 are fixed on a support 15 directly connected to the front partition 5, and indirectly to the lip 1 via two arms 31a, 31b.

As shown in this FIG. 6, two infrared emitters 13a, 13b are placed on either side of the support 15, the third 13c being placed at the end of said support, opposite the lip 1.

It will be noted that the alternatives shown in FIGS. 4 to 6 can also apply to an air intake lip comprising a honeycomb structure 14, as illustrated in FIG. 6.

Figure 7:
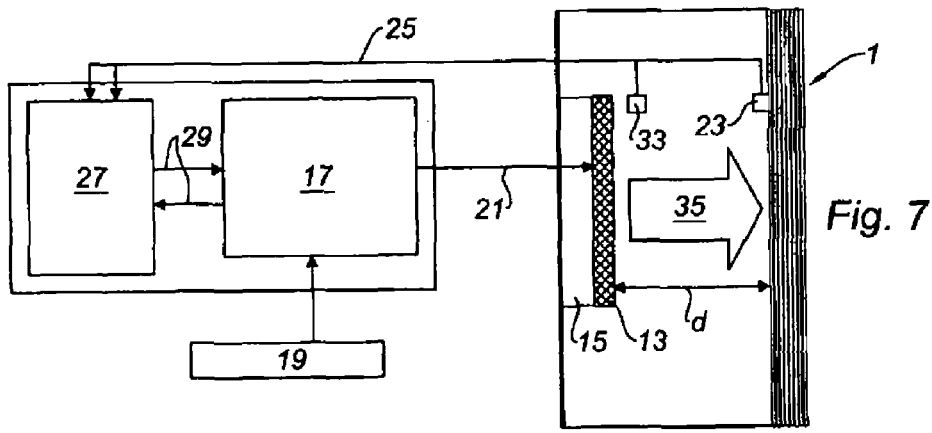
FIG. 7 shows, according to a view similar to that of FIG. 3, the control circuit of the system according to the invention according to said second embodiment.

FIG. 7 shows the electric control circuit of the infrared emitters of the alternatives of FIGS. 4 to 6.

Unlike the preceding embodiment, there are, other than the first sensors 23 arranged on the inner wall of the lip 1, second sensors 33 arranged in the immediate vicinity of the emitters 13, these first 23 and second 33 sensors being connected by suitable cabling 25 to the control means 27.

The presence of these two types of sensors makes it possible, using laws known by those skilled in the art (in particular Wien's law), to determine the regulation (of the voltage and/or intensity and/or duration) to be applied to the power supply of the emitters 13 so as to obtain a given infrared radiation band (for example 3.8 to 4.3 micrometers) and not to exceed a desired temperature on the inner wall of the lip 1, given the distance d separating these infrared emitters from said lip 1 (the infrared radiation being symbolized by the large arrow 35 shown in FIG. 7).

The distance d can typically vary between 0 and 400 mm.

The operating mode and advantages of the system according to the invention result directly from the preceding description.

To de-ice the air intake lip 1, or to prevent the formation of ice thereon, an electric current is sent into the infrared emitters 13, such that they emit infrared radiation toward the inner wall of the air intake lip 1.

This infrared radiation makes it possible to heat said air intake lip, directly (alternative of FIGS. 1 and 2) or indirectly (alternative of FIGS. 4 to 6).

The intensity of the infrared radiation and its emission band are controlled by the control means 27.

It should be noted that a radiation situated in the wavelengths between 3.8 µm and 4.3 µm is particularly suitable for heating an air intake lip made of a composite material.

It will be noted that the modular nature of the infrared emitters allows great flexibility of installation and orientation, allowing optimization of the de-icing or anti-icing effectiveness.

It will also be noted that the regulation of the infrared emitters 13 by the control means 27 can be done on each emitter independently, or by groups of emitters depending on the distance of the emitters, their number, their location in the cavity 7, and the nature of the materials of the lip to be heated.

It will also be noted that one can automatically monitor the proper operation of a working emitter: measuring the voltage and/or applied current and/or wall temperature of the lip makes it possible to detect a defect in one of the infrared emitters. In comparison with a minimum reference temperature recorded beforehand, one can then locally increase the electric energy of the neighboring emitters of the defective emitter to keep a suitable de-icing temperature.

It will also be noted that the system can be provided with an integrated self-test making it possible to detect an operating defect in the regulating system and the different groups of emitters during ground maintenance.

It will also be noted that, advantageously, a thermally insulating bedding 36 can be fixed on the front partition 5, so as to optimally insulate the cavity 7 in relation to the air intake area 9.

It emerges from the preceding description that the system according to the invention allows de-icing and/or anti-icing of an air intake lip or a leading edge of an aircraft wing that is light, very efficient, easy to repair, and completely protected from lightning.

Of course, the present invention is in no way limited to the embodiments described above, which were provided solely as examples.

The invention claimed is:

1. A de-icing system comprising:
   a leading edge of an aircraft wing or air intake lip of an aircraft engine;
   a plurality of infrared emitting members arranged inside a cavity defined by a front partition and said leading edge or said lip;
   a plurality of supports that extend between an inner wall of the air intake lip and the front partition and distributed evenly on an inner circumference of the air intake lip, wherein the plurality of infrared emitting members are fixed to the plurality of supports and are distanced from the inner wall of the air intake lip;
   power supply means for said emitters; and
   control means for adjusting a voltage, intensity and duration of said power supply means, so as to regulate heating energy radiated toward an inner wall of said leading edge of said lip,
   wherein said front partition separates said cavity from an inner area, thus functioning as both load-carrying structure and for thermal insulation of the cavity relative to the inner area,
   wherein said emitters are made of ceramic and have a radiated power/weight ratio of 500 W for 100 g, an emissivity of 97% at 800° C. over a spectrum between 1.5 µm and 10 µm, a surface energy greater than 70 kW per square meter, and an efficiency greater than 95%.

2. The de-icing system according to claim 1, wherein said infrared emitting members comprise heating resistors included in a ceramic having a highly emissive outer coating.

3. The de-icing system according to claim 1, wherein said power supply means can be connected to an on board power source of the aircraft or a power source located on the ground.

4. The de-icing system according to claim 1, further comprising first temperature sensors arranged near an inner wall of said leading edge or said lip and electrically connected to said control means, wherein said control means is capable of regulating voltage and/or intensity and/or duration of the power supply of said infrared emitting members as a function of signals received from said sensors.

5. The de-icing system according to claim 1, further comprising two temperature sensors arranged in an immediate vicinity of said infrared emitters and electrically connected to said control means, wherein said control means are capable of regulating voltage and/or intensity and/or duration of the power supply of said infrared emitters as a function of signals received from said second sensors.

6. The de-icing system according to claim 1, wherein said emitters are organized to be controlled either individually or in groups depending on de-icing needs and a size of said air intake.

7. The de-icing system according to claim 1, wherein said emitters are distributed such that a defect detected on one emitter by the control means causes an increase in power delivered by neighboring emitters, making it possible to offset said defect.

8. The de-icing system according to claim 1, wherein the system further comprises an integrated self-test that detects any defect of one component of the system during maintenance on the ground.

9. The de-icing system according to claim 1, comprising interrupting an operation of said power supply means for short periods during which one must make other equipment of said aircraft function.

10. The de-icing system according to claim 1, comprising controlling said power supply means such that said infrared emitters emit in a given radiation band, set in advance and depending on a material making up the leading edge or the air intake lip, so as to provide heat transfer toward the surface to be de-iced.

* * * * *